United States Patent [19]

Weinrotter et al.

[11] Patent Number: 5,486,412
[45] Date of Patent: Jan. 23, 1996

[54] FLAME RETARDANT HIGH-TEMPERATURE-RESISTANT POLYIMIDE FIBERS AND MOLDED ARTICLES MANUFACTURED THEREFROM

[75] Inventors: Klaus Weinrotter; Robert Vodiunig, both of Vocklabruck, Austria

[73] Assignee: Lenzing Aktiengesellschaft, Lenzing, Austria

[21] Appl. No.: 168,558

[22] Filed: Dec. 16, 1993

Related U.S. Application Data

[63] Continuation of Ser. No. 442,351, Oct. 20, 1989, Pat. No. 5,271,889.

[30] Foreign Application Priority Data

Feb. 26, 1988 [AT] Austria ................................. A 495/88

[51] Int. Cl.⁶ ............................ B29D 28/00; D04H 1/04; C08G 8/02; C08G 14/00
[52] U.S. Cl. ......................... 428/288; 428/296; 528/125; 528/126; 528/128
[58] Field of Search ...................................... 428/296, 287, 428/288, 473.5; 528/125, 126, 128; 264/163, 258, 331.12, DIG. 71

[56] References Cited

U.S. PATENT DOCUMENTS

| | | |
|---|---|---|
| 2,991,537 | 7/1961 | Moler et al. . |
| 3,286,008 | 11/1966 | Power et al. ............................ 264/126 |
| 3,717,696 | 2/1973 | Rochina et al. .......................... 264/205 |
| 3,870,677 | 3/1975 | Farrissey, Jr. et al. . |
| 3,930,097 | 12/1975 | Alberino et al. . |
| 3,985,934 | 10/1976 | Farrissey, Jr. et al. ................. 428/397 |
| 4,188,690 | 2/1980 | Suzuki et al. . |
| 4,237,180 | 12/1980 | Jaskowski . |
| 4,265,954 | 5/1981 | Romanek . |
| 4,370,290 | 1/1983 | Makino et al. ......................... 264/184 |
| 4,474,846 | 10/1984 | Doerer et al. . |
| 4,476,183 | 10/1984 | Holtrop et al. . |
| 4,801,502 | 1/1989 | Weinrotter et al. ..................... 428/397 |
| 4,818,586 | 4/1989 | Smith et al. . |
| 4,891,084 | 1/1990 | Senior .................................... 428/296 |
| 5,178,810 | 1/1993 | Vodiunig et al. ....................... 264/126 |
| 5,229,184 | 7/1993 | Campbell et al. . |

FOREIGN PATENT DOCUMENTS 0337597  10/1989  European Pat. Off. .

OTHER PUBLICATIONS

New Materials Offer Undreamed of Opportunities For The Opportunities For The Aerospace Industry.
Roughly translated, Lightweight Fiber for Aviation and Space Industry.
K. G. Buller, Heat and Thermoresistant Polymers (roughly translated); M., Chemija, 1984, 7.1.1.9, p. 744, Nauka, 1983, p. 290.

*Primary Examiner*—George F. Lesmes
*Assistant Examiner*—Terrel Morris
*Attorney, Agent, or Firm*—Kenyon & Kenyon

[57] ABSTRACT

The present disclosure describes flame-retardant, high-temperature resistant polyimide fibers, nonwovens made from said fibers, as well as the fibers and molded articles obtained after a heat treatment. A composite of such fibers is heated to a temperature in the glass transition range of the fiber, i.e. between 280° and 350° C. This heat treatment develops a contraction force of 0.3 to 1.1 cN in the fibers which results in a fiber shrinkage of between 20 and 60% and the formation of cohesive bonds. The fibers of the invention enable the manufacture of molded articles that are particularly strong, have a high temperature resistance and flame-retardant properties, while having a relatively low density.

4 Claims, 2 Drawing Sheets

FLAME RETARDANT HIGH-TEMPERATURE-RESISTANT POLYIMIDE FIBERS AND MOLDED ARTICLES MANUFACTURED THEREFROM

This application is a continuation of application Ser. No. 07/442,351, filed on Oct. 20, 1989, now U.S. Pat. No. 5,271,889.

BRIEF SUMMARY OF THE INVENTION

The present invention relates to flame-retardant, high-temperature-resistant polyimide fibers based on recurring structural elements of the general formula

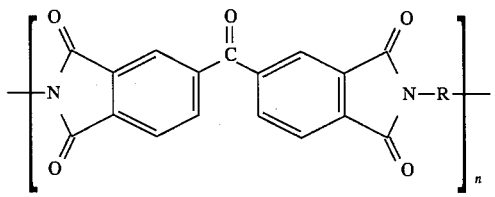

in which R is the group

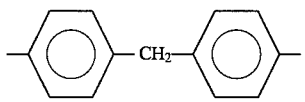

and/or the group

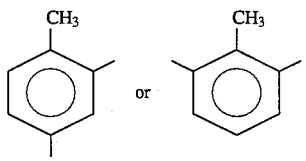

a nonwoven made from such fibers, as well as the fibers and molded articles prepared by heating said fibers to about their glass transition temperature.

Copolyimide fibers having the above structural elements are known. E.g., U.S. Pat. Nos. 3,985,934 and 4,801,502. It is also known in the art that most stretched synthetic fibers shrink when heated close to the fiber's stretching temperature. For example, special polyolefin, polyester, polyvinyl chloride, and polyamide fibers shrink by about 50% when heated to such a temperature. The manufacturing process imparts this property to these fibers. Synthetic fibers are commonly stretched after spinning to orientate the polymer molecules. Strong intermolecular forces prevent the stretched molecules from contracting and convoluting (i.e., relaxing). At elevated temperatures, these forces are progressively overcome, allowing the fiber to reach a state of correspondingly higher entropy, thus developing a contracting force which shrinks the fiber.

Synthetic fibers having a high shrinkage capacity are used to thermally compact random nonwovens. This process is described, for example, in German Application 1,785,165, and in U.S. Pat. Nos. 4,188,690, and 4,237,180.

The German Application 1,785,165 discloses a procedure for the manufacture of felts from a random nonwoven consisting of at least two types of fibers. One of the fiber types shrinks considerably more than the other when the nonwoven is heated to an elevated temperature.

U.S. Pat. No. 4,237,180 discloses insulating materials comprising a mixture of inorganic and organic fibers. The organic fibers shrink when heated to an elevated temperature. This shrinkage compacts the fiber web.

U.S. Pat. No. 4,188,690 discloses the manufacture of a structureless nonwoven from a web of highly shrinkable organic fibers which by heat treatment shrink the web area approximately 50%.

Fibers having a high shrinkage capacity are also used as components for high-bulk yarns (R. W. Moncrieff, *Man Made Fibers*, 5th ed., 1970, Heywood Books, pp 461, 514, and 641).

To make highly stable molded articles from nonwovens, the nonwoven's fibers should have a high shrinkage capacity. It is also desirable that such molded articles exhibit high temperature resistance and flame-retardant properties. Such fibers and nonwovens are useful in the airplane, electrical engineering and automotive industries. Prior to the present invention fibers having a high shrinkage capacity, high temperature resistance and flame-retardant properties had not been identified.

Some polyamide fibers, such as, e.g., a conventional shrinkable meta-aramide fiber (NOMEX T 463, made by Du Pont), have good thermal properties. However, these fibers do not shrink sufficiently which restricts their utility.

Polyimide fibers having the structural elements described above are known to possess excellent thermal properties. Moreover, the gases produced at the decomposition temperature of these fibers exhibit a low smoke density and the toxicity of these fumes is slight. An object of the present invention is to make polyimide fibers that are useful in the manufacture of molded articles having a high tensile strength, a high temperature resistance, and flame-retardant properties, and yet also have a relatively low density. Furthermore, such molded articles should be machinable and able to be further molded.

DETAILED DESCRIPTION OF THE INVENTION

Figure 1:
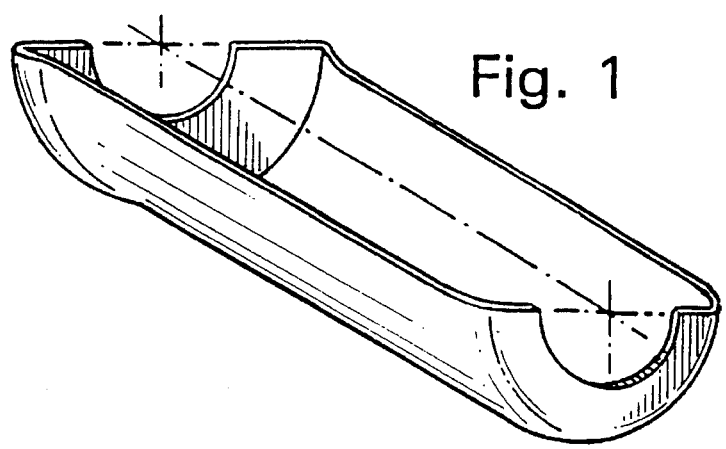
FIG. 1 is a cut-away view of a three-dimensional molded article according to the present invention.

The basic recurring structural units of the polyimide fibers used in the present invention have the general formula
in which R is the group
and/or the group
wherein said fibers have
- a contraction force of 0.3 to 1.1 cN when heated at elevated temperatures;
- a fiber shrinkage of 20 to 60% when heated at elevated temperatures; and
- the presence of 0.5 to 3% low molecular components, for example solvents and oligomers;

whereby, heating said fibers results in the formation of cohesive bonds between individual fibers.

Polyimide fibers can be stretched to a ratio of 1:4 to 1:10, and preferably are stretched in a ratio of 1:4 to 1:7.

The presence of low-molecular components such as solvents and oligomers is a key feature of the present invention. Useful solvents include strongly polar, organic solvents, such as, e.g., dimethylformamide, dimethylacetamide, N-methyl pyrrolidone, and the like. Such low-molecular components are key to the manufacture of highly stable molded articles.

The role of the low-molecular components is assumed from the partial emission observed at elevated temperatures contemporaneous with a powerful contraction force and a high degree of fiber shrinkage. Thus, cohesive bonds are formed between the individual fibers during this thermal process, even though these polyimide fibers do not have a melting point as such. These cohesive bonds impart an extraordinary stability and strength to the subsequently formed molded articles.

The heat-treated fibers have the following features:

a) after being heated to a temperature near the fiber's glass transition temperature, e.g., between 280° and 350° C., preferably between 300° and 330° C., the fibers shrink to 20–60% of their original length;

b) cohesive bonds exist between the individual fibers;

c) a titer which is up to 300% of the fiber's titer before the heat treatment;

d) a reduced tensile strength, which is up to 30% less than the tensile strength of the fiber before the heat treatment; and e) a fiber elongation up to 300% of that of the fiber before the heat treatment.

In one embodiment of the present invention, the fibers of a polyimide fiber nonwoven are intertwined by a needling process before the heat treatment. This product has a weight per unit area between 60 grams per square meter and 3000 grams per square meter.

Molded articles of the present invention can be made from any polyimide fiber composite, including e.g., wovens and knits in single or multi-layer form. Any of these fiber composites, when heated to about the fiber's glass transition temperature, between 280° and 350° C., and preferably 300° to 330° C. and, if appropriate, pressurized, will result in useful molded articles.

The molded articles according to the invention have an ultimate tensile strength between 5 and 50N/square mm, an elongation at break between 5 and 80%, a moduli of elasticity between 100 and 500N/square mm, and a bending strength of up to 30N/square mm.

Furthermore, when the molded articles of the present invention are heated to temperatures about the fiber's glass transition point they are themselves moldable. Additionally, these molded articles have a maximum density of 1.20 g/cc.

Since the density of the polymer is 1.41 g/cc, the molded article comprises a "void volume". In other words, the molded articles contain small voids, which owing to their small size, act like capillaries and are capable of absorbing, for example, water. At room temperature, the molded article can absorb an amount of water equal to 10 to 50% of molded article's mass. The molded article's capillary forces also act on any other liquid having a viscosity of less than about 50 Pas.

Without pressurization, the molded articles according to the invention can attain a density of 1.20 g/cc.

The machinability of the molded article is very significant to their industrial utility. Molded articles according to the invention can be machined, trouble-free, e.g., by sawing, drilling, milling or grinding. Due to their more or less fibrous surface, these molded articles also have excellent adhesive properties.

The present invention also comprises a process for the manufacture of the molded articles of the invention. In one embodiment of the process of the present invention, while the fiber composite is heated to a temperature in the glass transition range between 280° to 350° C., and preferably 300° to 330° C., the composite is molded into the desired shape through the use of a molding means, such as a die. During the molding process a contracting force of between 0.3 and 1.1 cN develops, and the density of the composite increases up to ten times its initial value.

It is advantageous to limit the heat treatment during molding process to between 1 and 30 minutes.

By means of this process it is possible to obtain faithful reproductions of three-dimensional structures of any configuration by exact shrinking on a die. FIG. 1 shows such a three-dimensional molded article prepared by the shrinking a polyimide fiber nonwoven on a shell-like die.

The nonwoven used to prepare the three dimensional article of FIG. 1 had a thickness of 2.5 mm. This nonwoven consisted of polyimide fibers made from 3,3'-4,4'benzophenone tetracarboxylic acid dianhydride, 4,4'-methylene bis (phenylisocyanate), 2,4-toluene diisocyanate and 2,6-toluenediisocyanate which had been stretched to a ratio of 1:4. The nonwoven contained 1.5%, by weight, low-molecular components, such as dimethyl formamide and oligomers. It was heated at 320° C. for 10 minutes to obtain the molded article shown in FIG. 1.

The resulting molded article had a thickness of 1 mm, an ultimate tensile strength of 19N/square mm, an elongation at break of 32%, and a density of 0.4 g/cc.

The invention is described below in greater detail.

A) Effect of the Heat Treatment on Fiber Properties

Table 1 illustrates how the titer, the shrinkage capacity, and the contraction force of a polyimide fiber, stretched to a ratio of 1:4, change with temperature.

TABLE 1

| Temperature (C.) | untreated | 280 | 300 | 320 | 330 | 350 | 370 | 400 |
|---|---|---|---|---|---|---|---|---|
| Titer (dtex) | 2.3 | 2.6 | 2.4 | 3.4 | 4.6 | 5.3 | 6.0 | 6.2 |
| Shrinkage (%) | — | 0.3 | 2.2 | 7.2 | 20 | 28 | 40 | 44 |
| Contraction force(cN) | — | — | 0.20 | 0.29 | 0.31 | 0.25 | 0.12 | — |

Figure 2A:
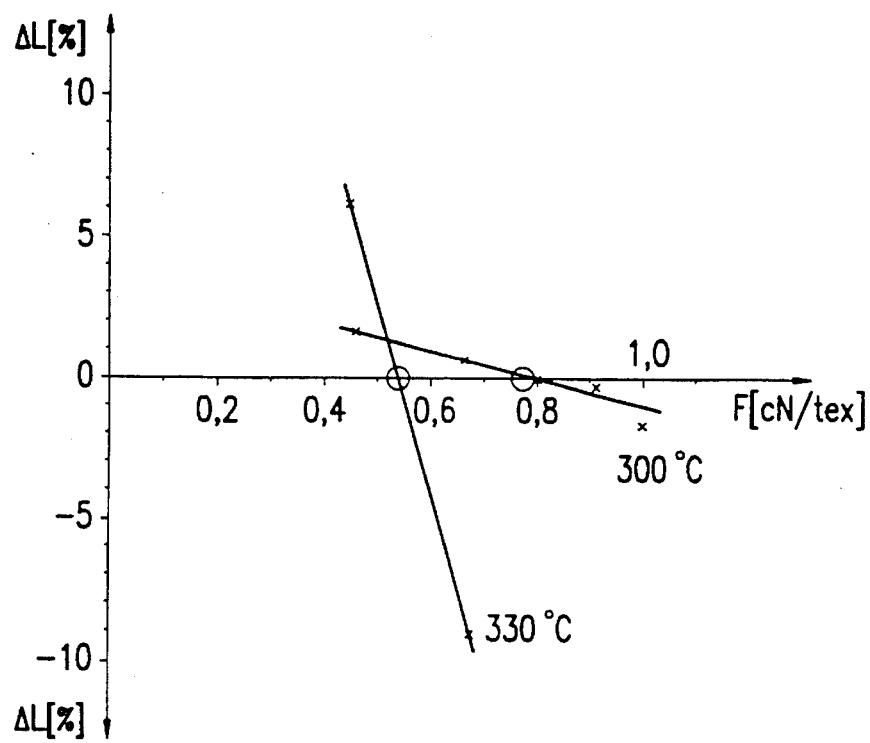
FIG. 2(a–b) is a chart which shows the functional relationship between the contraction force and the load (in cN/tex) for a specific temperature.
Figure 2B:
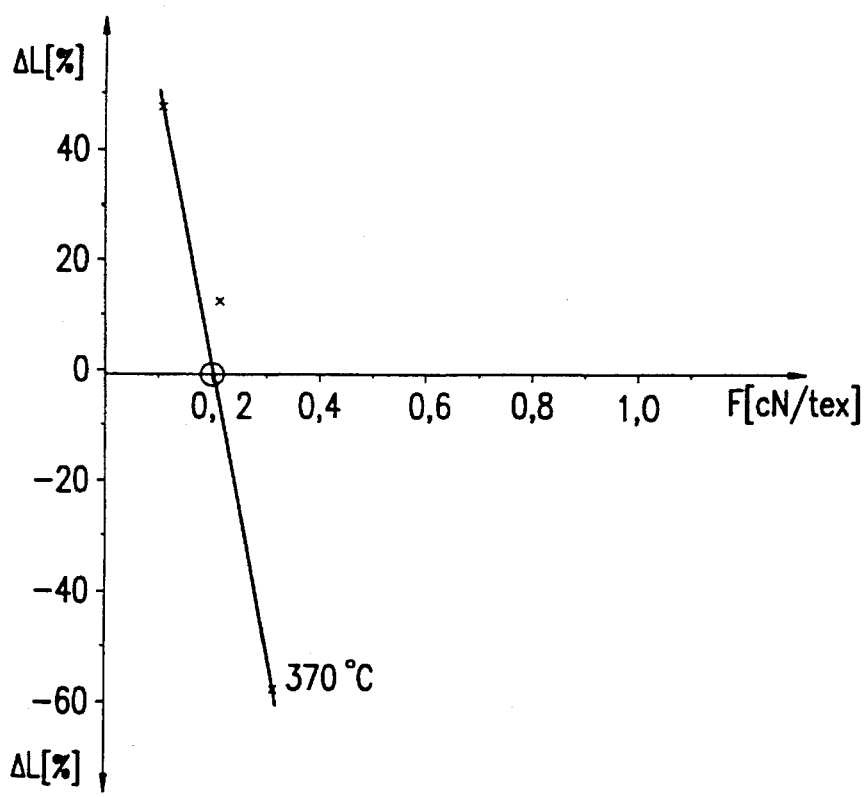

The contraction force is the mathematical product of the shrinkage stress and the relevant fiber titer. The shrinkage stress was determined by measuring the change in length, $\Delta n$ (in %), of individual fibers under different loads after heating to a specified temperature. These findings are presented in FIG. 2. The shrinkage stress is that load (in cN/tex) at which the fiber does not show any change in length after being heated to the test temperature. The shrinkage stress value for a test temperature is obtained by interpolation. FIG. 2 shows this determination for three test temperatures.

Table 1 shows that the fibers develop their highest contraction force over a narrow temperature range around 330° C. This temperature is close to the glass transition point of the fiber (315° C.) This behavior is unusual as stretched synthetic fibers normally relax over a wide temperature range starting at the glass transition point. Stretched synthetic fibers also normally generate contracting forces that rise, continuously or otherwise, with increasing temperature. This rise can usually be observed almost up to the melting point range.

According to Table 1, the tested fibers (stretching ratio of 1:4) exhibited a 20% shrinkage when the contraction force was at its maximum. These conditions were adequate to compact, for example, a polyimide fiber composition according to the invention. This compression was achieved solely by heating the nonwoven to temperatures of between 300° and 330° C. without pressurization. This result is possible only because the contraction force, the shrinkage capacity and the emission of the low molecular components act contemporaneously in a most favorable manner.

Figure 3:
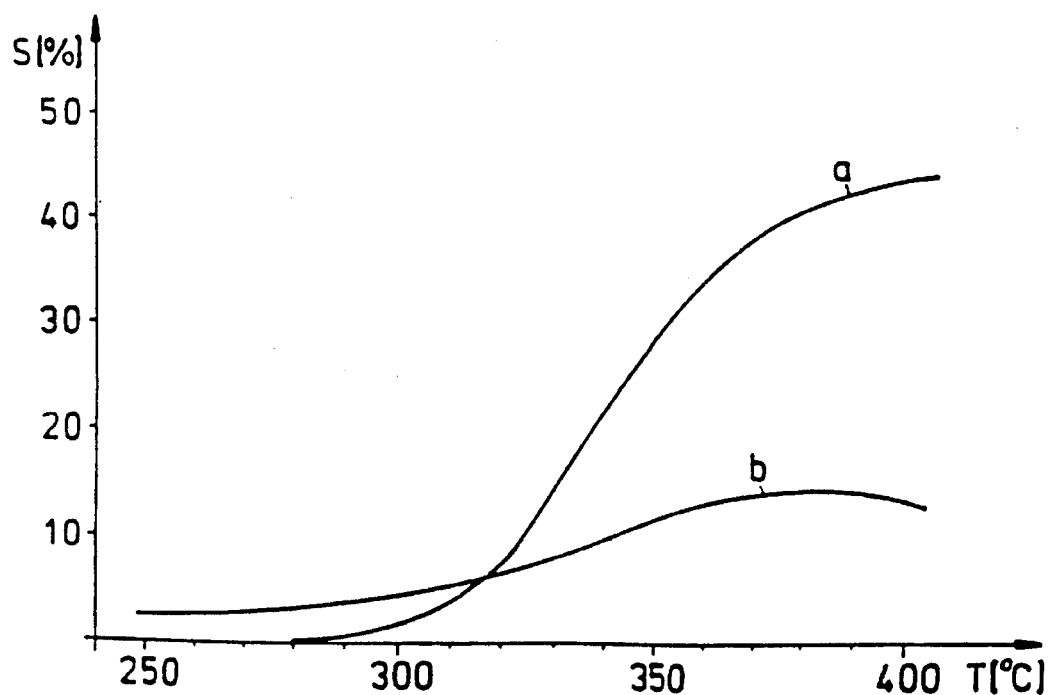
FIG. 3 is a chart which shows the functional relationship between fiber shrinkage and temperature for a meta-aramide fiber and a polyimide fiber according to the present invention.

FIG. 3 shows fiber shrinkage S (in % of its initial length) as a function of the temperature (curve a). In contrast, curve b shows the shrinkage behavior of a conventional meta-aramide fiber which its manufacturer describes as "high-shrinkage fiber." It can readily be seen that the shrinkage capacity of the polyimide fiber according to the invention exceeds many times over that of the meta-aramide fiber. The picture becomes more favorable for the polyimide fiber when the stretching ratio is above 1:4.

B) Effect of the Stretching on Fiber Properties

The stretching of a synthetic fiber following spinning orients the long polymer molecules parallel to the fiber axis. This stretching results in a fiber with a high degree of molecular orientation and strong intermolecular forces which ensure that this stretched structure is retained. The degree of molecular orientation increases with the stretching ratio. On heating to an elevated temperature, the fiber begins to lose this degree of molecular orientation and develops a contraction force. The contraction force increases as the fiber loses its orientation. As shown in Table 2, this behavior is also seen in the polyimide fiber used in the invention.

TABLE 2

| Stretching | 1:2 | 1:4 | 1:5 | 1:6 | 1:7 |
| --- | --- | --- | --- | --- | --- |
| Titer (dtex) | | | | | |
| before* | 2.54 | 2.28 | 2.23 | 2.27 | 2.25 |
| after* | 3.41 | 4.18 | 4.07 | 5.72 | 6.01 |
| Shrinkage (%) | 4 | 19 | 22 | 26 | 40 |
| Contraction force (cN) | 0.10 | 0.31 | 0.36 | 0.80 | 0.90 |

*heated to 330° C.

C) Mechanical Properties of Shrunk Polyimide Fiber Composites

A conventionally needled, polyimide fiber nonwoven with an initial weight per unit area of 1000 g/square meter and a thickness of 9 mm was exposed to an air stream having an average temperature of 330° C. for three minutes. During the heat treatment, the weight per unit area increased to 4800 g/square meter and the shrunk nonwoven had a density to 0.75 g/cc. The product had an ultimate tensile strength of 15 N/square mm and an elongation at break of 5%. These values were determined in accordance with German Standards DIN 53,455. It was also noted that, when the duration of the heat treatment was doubled, the density remained substantially constant while the ultimate tensile strength increased to 20N/square mm and the elongation at break increased to 7%.

Table 3 shows the mechanical properties of a series of products obtained from nonwovens of different initial densities.

TABLE 3

| Density before HT (g/cc) | 0.11 | 0.05 | 0.06 | 0.10 | 0.20 |
| --- | --- | --- | --- | --- | --- |
| Density after HT (g/cc) | 0.22 | 0.30 | 0.60 | 0.70 | 1.00 |
| Ultimate tensile strength (N/sq. mm) | 5 | 5 | 16 | 20 | 24 |
| Elongation at break (%) | 6 | 55 | 15 | 7 | 20 |
| Bending strength (N/sq. mm) | * | * | * | * | 28 |

* Specimen did not break
HT = heat treatment

The following is a description of two additional embodiments of the molded articles of the invention made from shrunk, needled polyimide fiber nonwovens and of the process for making the same.

First, a nonwoven secured in a tenter frame was heated. For that purpose, a nonwoven secured in this manner (having fibers of a titer of 2.2 dtex, a staple length of 60 mm, a stretching ratio of 1:6, a solvent content of 2.5% and a weight per unit area of 150 g/square meter) was heated to a temperature of 340° C. for 10 minutes. The thermally compacted nonwoven had an ultimate tensile strength of 5N/square mm and an elongation at break of 80%.

A density of 1.2 g/cc was achieved by heating a needled nonwoven of staple fibers (staple length of 60 mm, titer of 2.2 dtex) having a thickness of 12 mm and an initial weight per unit of area 2000 g/square meter to a temperature of 340° C. for 20 minutes. The thermally compacted nonwoven had an ultimate tensile strength of 50N/square mm, an elongation at break of 5% and a bending strength of 30N/square mm.

By varying the duration and temperature of shrinking, the density of the fiber composition, and corresponding length and width specifications of a tenter frame, it is possible to control the mechanical properties of product.

It has also proven to be advantageous to perform the heat treatment by suctioning hot air or hot inert gas through the fiber composition. In this way, it is possible to manufacture molded articles having ultimate tensile strengths of 5 to 50N/square mm, elongations at break of 5 to 60%, and moduli of elasticity of 100 to 500N/square mm, as well as bending strengths of up to 30N/square mm.

The molding of the polyimide fiber composite can be enhanced during or after the shrinkage process by a light pressurization of 1 to 10N/square mm. Such a pressurization can smooth out the fibrous surface of the nonwoven. This pressurization can also be used to emboss relief-type patterns into the surface of the product.

After completion of the shrinkage process, upon reheating the product to a temperature near the polyimide fiber's glass transition point, the fiber composites were again moldable. The new shape remained stable after cooling.

All of the molded articles manufactured according to the invention proved to be machinable with conventional machines known in the wood and plastic industries.

Figure 4:
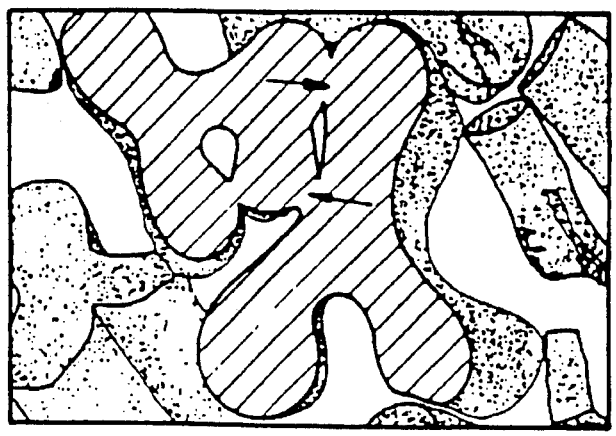
FIG. 4 shows an electron-optical photograph of a product according to the present invention magnified 2000 times.

The excellent mechanical properties of the heat-treated fibers or molded articles according to the invention are attributed to the physical mechanical linking of the fibers during the shrinkage process and also to the formation of cohesive bonds between the individual fibers. These bonds can be detected using electron optics. FIG. 4 shows an electron-optical photograph of a heat-treated polyimide fiber composite magnified 2000 times. What can be seen are individual fibers as well as the cross-section of two fibers fused by two cohesive bonds. The two bonding points are indicated by arrows.

We claim:

1. A rigidified machineable, molded article comprising a quantity of heat-shrunk polyimide fibers fused by cohesive bonds corresponding to the general formula:

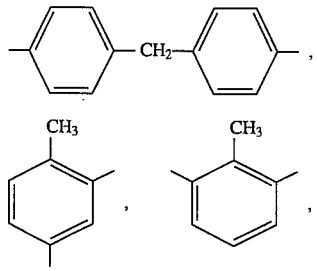

wherein R is selected from the group consisting of

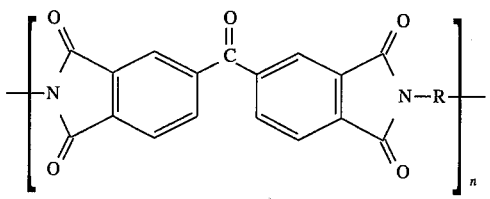

and combinations thereof, said quantity of polyimide fibers being sufficient to impart flame retardant and high-temperature stability properties to said molded article and said molded article having a tensile strength of 5–50 N/mm$^2$, a breaking elongation of 5 %–80%, an E-moduli of 100–500N/mm$^2$ and a density of 1.20 g/cm$^3$ or less.

2. A molded article according to claim 1 which further comprises pores capable of absorbing a low viscosity liquid.

3. A rigidified, machineable, molded article comprising a quantity of polyimide fibers that are heat-shrunk and fused by cohesive bonds at a temperature ranging from 280° to 350° C. for a period of 1 to 30 minutes, said polyimide fibers being dispersed throughout said molded article and corresponding to the general formula:

wherein R is selected from the group consisting of

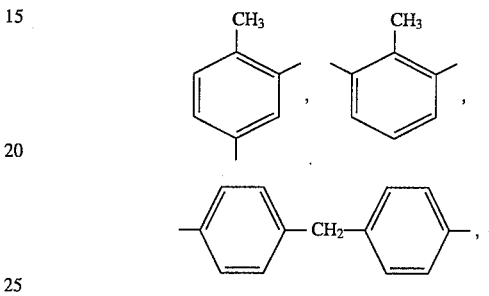

and combinations thereof, said quantity of polyimide fibers being sufficient to impart flame retardant and high-temperature stability properties to said molded article, said molded article having a tensile strength of 5–50 N/mm$^2$, a breaking elongation of 5 %–80%, an E-moduli of 100–500N/mm$^2$ and a density of 1.20 g/cm$^3$ or less, and said molded article being again moldable upon reheating said molded article to said temperature ranging from 280° to 350° C.

4. The rigidified, machineable, molded article of claim 3, wherein said polyimide fibers are heat-shrunk and fused without pressurization.

* * * * *

UNITED STATES PATENT AND TRADEMARK OFFICE
CERTIFICATE OF CORRECTION

PATENT NO. : 5,486,412
DATED : 23 January 1996
INVENTOR(S) : Klaus WEINROTTER et al.

It is certified that error appears in the above-indentified patent and that said Letters Patent is hereby corrected as shown below:

| Column | Line | |
|---|---|---|
| 2 | 55 | After "formula" insert -- 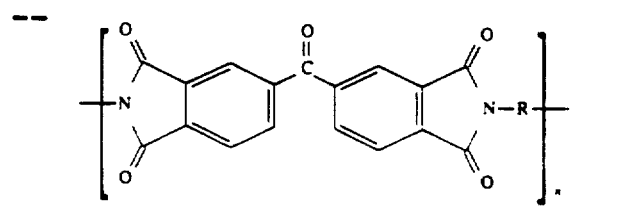 -- |
| 2 | 56 | After "group" insert -- 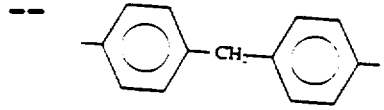 -- |
| 2 | 57 | After "group" insert -- 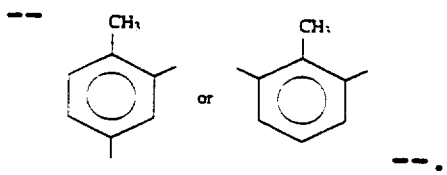 --. |

UNITED STATES PATENT AND TRADEMARK OFFICE
CERTIFICATE OF CORRECTION

PATENT NO. : 5,486,412
DATED : 23 January 1996
INVENTOR(S) : Klaus WEINROTTER et al.

It is certified that error appears in the above-indentified patent and that said Letters Patent is hereby corrected as shown below:

| Column | Line | |
|---|---|---|
| 4 | 54 | Change "n" to --L--. |
| 8 | 12 | After "formula:" insert |

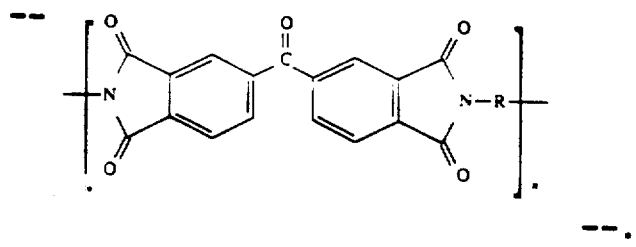

--.

Signed and Sealed this

Twenty-eighth Day of May, 1996

Attest:

BRUCE LEHMAN

Attesting Officer   Commissioner of Patents and Trademarks